United States Patent [19]
Maruyama et al.

[11] Patent Number: 5,267,910
[45] Date of Patent: Dec. 7, 1993

[54] SILENT CHAIN HAVING IMPROVED NOISE REDUCTION

[75] Inventors: Masao Maruyama; Masaru Morimoto, both of Hanno; Hiroki Ishida, Osaka; Nobuyuki Fujimoto, Hanno, all of Japan

[73] Assignee: Tsubakimoto Chain Co., Osaka, Japan

[21] Appl. No.: 11,357

[22] Filed: Jan. 29, 1993

[30] Foreign Application Priority Data

Mar. 30, 1992 [JP] Japan .......................... 4-026094[U]

[51] Int. Cl.$^5$ .................................................. F16G 1/22
[52] U.S. Cl. ................................................... 474/212
[58] Field of Search ............................ 474/212–217, 474/206

[56] References Cited

U.S. PATENT DOCUMENTS 1,727,129  9/1929  Morse .
4,345,904  8/1982  Numazawa et al. ............. 474/215
4,759,740  7/1988  Cradduck .................. 474/213 X
4,915,675  4/1990  Avramidis .................. 474/214 X
4,915,676  4/1990  Komeya ....................... 474/213
5,114,384  5/1992  Tsuyama ...................... 474/212

Primary Examiner—Thuy M. Bui
Attorney, Agent, or Firm—Howson and Howson

[57] ABSTRACT

Noise reduction in a silent chain is achieved by forming the majority of the toothed link plates with modified tooth profiles having a circular concave portion conforming t the shape of the teeth of the sprocket engaged by the chain, and a circular convex portion near the tip, the center of curvature of the convex portion being on the dedendum side of the pitch line. Additional link plates having a different meshing pitch are disposed at irregular intervals along the length of the chain. These additional link plates can have linear of modified tooth profiles.

2 Claims, 2 Drawing Sheets

SILENT CHAIN HAVING IMPROVED NOISE REDUCTION

BRIEF SUMMARY OF THE INVENTION

This invention relates to endless power transmission chains for transmitting rotational power between sprockets, and more particularly to a chain of the so-called "silent" type.

A typical silent chain comprises multiple rows of link plates interconnected by transverse pins in a closed loop. Each link plate typically has two inwardly projecting teeth, which are engageable with the teeth of sprockets, usually two in number, around which the chain is wrapped.

Although a silent type chain is generally quieter in operation than other forms of power transmission chain, it nevertheless produces some noise, primarily due to the meshing of the teeth of the chain with the teeth of its sprockets. Various techniques have been proposed for reducing meshing noise. One approach has been to interpose leaf springs between toothed link plates of the chain in order to push the link plates laterally. The leaf springs urge the side surfaces of the link plates into frictional contact with each other. The friction between the sides of the link plates at the ends thereof, suppresses meshing shock and chord vibration generated in the chain, and consequently reduces the noise generated by the chain in its operation. Another approach has been to construct the chain so that some of its link plates have a different meshing pitch than others, or so that the meshing surfaces of some link plates have a different pressure angle than the meshing surfaces of others. Mixing the various link plates irregularly along the length of the chain disperses the points at which meshing noises are generated, and reduces the overall noise generated by the chain by virtue of the mutual interference of individually generated noises.

The first of the above conventional techniques is intended to reduce the average value of the noise as a whole throughout the full range of operating speeds of the chain. The second of the above techniques is intended to suppress the peak sound due to resonance. However, it has been difficult to achieve simultaneous reduction in the overall average noise level and suppression of peak sound.

The primary object of this invention is to provide a simple and effective means for simultaneously reducing average and peak noise in a silent chain. Another object of the invention is to provide for improved reduction in the average level of the noise produced by operation of a silent chain. Still another object of the invention is to provide a power transmission comprising at least two sprockets interconnected in driving relationship by a silent chain, in which average and peak noise are simultaneously reduced.

In accordance with the invention, multiple link plates are interconnected to form a closed loop adapted for connection of two or more sprockets in driving relationship. Each link plate has meshing surfaces adapted to engage the teeth of a sprocket at a pitch line. The majority of the link plates in the chain are link plates in which the meshing surfaces have a modified tooth profile in the form of a continuous curved surface composed of a concave circular arc having a radius of curvature approximately equal to the radius of curvature of the sprocket tooth at the meshing point, and a convex circular arc having a radius of curvature such that the convex arc is positioned to interfere slightly with the sprocket teeth which it engages. The center of curvature of the convex arc is situated on the dedendum side of the pitch line relative to the chain. In one embodiment of the invention, the meshing surfaces of a minority of the link plates in the chain are in the form of linear tooth profiles and these link plates are disposed irregularly along the length of the chain. The meshing pitch of each of the linear tooth profile link plates is slightly different from that of the modified tooth profile link plates. In another embodiment of the invention, the link plates having the modified tooth profile include a set of link plates, each having a meshing pitch slightly different from the meshing pitch of the remaining link plates having a modified tooth profile. Here also, the link plates having a different meshing pitch are disposed irregularly along the length of the chain. The number of link plates of the set having a slightly different meshing pitch is preferably less than the number of the remaining link plates of the majority.

When the meshing surface of a modified tooth profile link plate initially meshes with a sprocket tooth, meshing begins with the sprocket tooth engaging the tip of the link plate. Since the tooth profile of the tip portion is not linear, but rather in the form of a convex circular arc having its center of curvature situated on the dedendum side with respect to the meshing pitch line, interference between the convex, circular surface of the modified tooth profile and the sprocket tooth is significantly reduced, and the durability of the toothed link plate and the sprocket is increased. As the meshing proceeds, the meshing contact between the link plate meshing surface and the sprocket tooth is shifted to the dedendum portion of the meshing surface of the link plate, the profile of which is in the form of a concave circular arc.

Since the curvature of the concave, circular portion of the link plate tooth profile is approximately equal to curvature of the profile of the sprocket teeth, the contact area between the tooth profiles is increased, meshing shock is relaxed, and the average noise level is reduced. Furthermore, by arranging the link plates having a different meshing pitch so that they are irregularly disposed along the chain, the meshing periods are made uneven, and the resonance exciting periods are dispersed. Consequently, the generation of peaks in the sound level is suppressed.

Further objects, details and advantages of the invention will be apparent from the following detailed description, when read in conjunction with the drawings.

DETAILED DESCRIPTION

Figure 1:
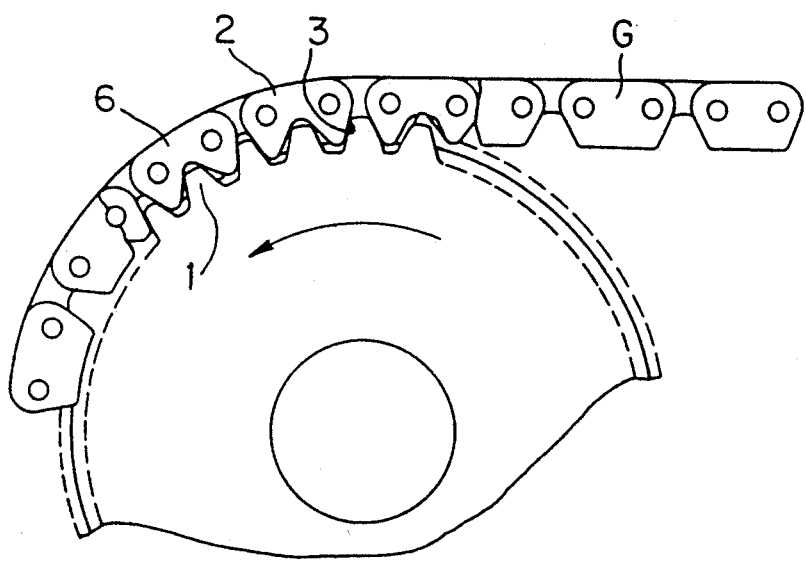
FIG. 1 is a fragmentary elevational view, partially broken away, showing the engagement of a silent chain with a sprocket.

FIG. 1 depicts the meshing of the toothed link plates of a silent chain with a sprocket. Parts of some of guide links G are omitted so that the link plates are visible. The sprocket has conventional sprocket teeth 1 the meshing surfaces of which are in the form of an involute tooth profile. The chain of FIG. 1 comprises interconnected toothed link plates. The majority of the toothed link plates are link plates 2, with meshing surfaces 3 having a modified tooth profile. The minority of the toothed link plates are tooth plates 6, having a linear tooth profile.

Figure 2:
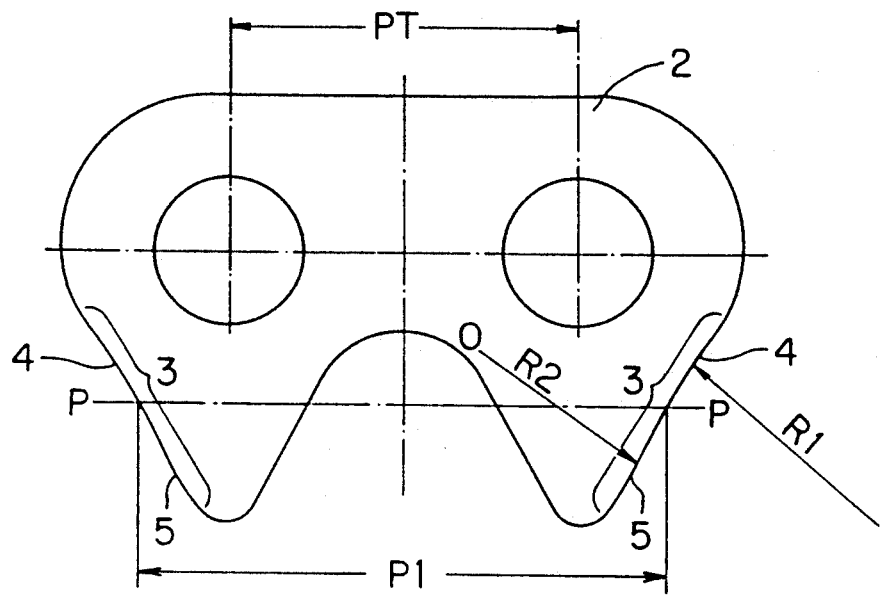
FIG. 2 is an enlarged elevational view of a link plate in accordance with the invention, having a modified tooth profile.

The tooth profile of the modified link plates, as shown in FIG. 2, is a continuous curved surface 3 composed of a concave circular arc 4 and a convex circular arc 5. The concave circular arc 4 has a radius of curvature R1, preferably approximately equal to the radius of curvature of the profile of sprocket tooth 1 at the meshing pitch line P—P, although the radius of curvature R1 can be somewhat greater than that of the tooth profile at the pitch line. Convex surface 5 has a radius of curvature R2 about 1 to 1.5 times as large as radius of curvature R1, with the center of the curvature 0 situated on the dedendum side (with reference to the chain teeth, not to the sprocket teeth) of pitch line P—P. Further, the modified tooth profile link plate 2 has a meshing pitch P1 measured along the pitch line P—P.

Figure 3:
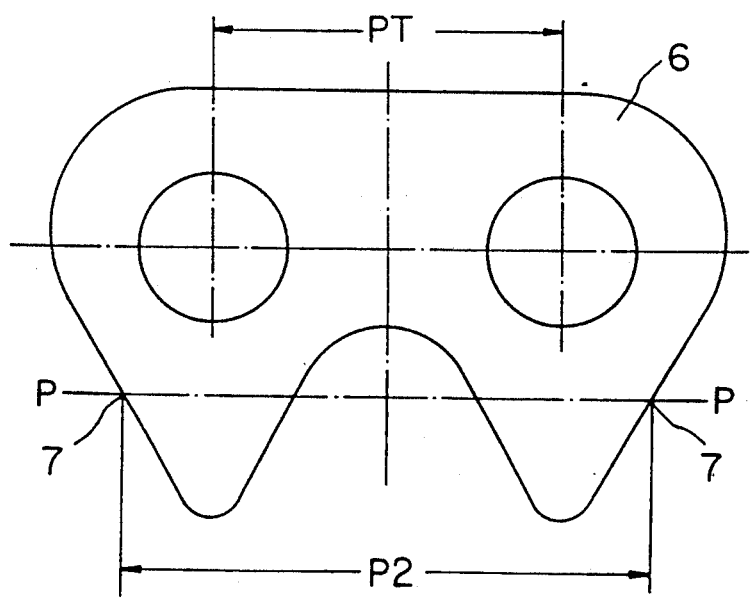
FIG. 3 is an enlarged elevational view of a link plate having a linear tooth profile.

As shown in FIG. 3, the meshing surfaces of link plates 6 are in the form of linear tooth profiles 7. The meshing pitch P2 of these linear tooth profile link plates 6 is slightly smaller than the meshing pitch P1 of above modified tooth profile link plate 2. The majority of the links of the chain are modified tooth profile link plates 2. Link plates 6, which are in the minority, are disposed at irregular intervals along the length of the chain.

In a second embodiment, a majority of the link plates in the chain are modified tooth profile link plates as shown in FIG. 2. Of these, most have a pitch P1. However, some of the modified tooth profile link plates, which have a tooth profile substantially identical to that depicted in FIG. 2, have a pitch slightly different from P1. These latter link plates are less in number than the modified tooth profile link plates having a pitch P1, and are disposed at irregular intervals along the length of the chain, as in the case of the linear tooth profile link plates in the first embodiment.

In both embodiments of the invention, the meshing surfaces of the majority of the toothed link plates of the chain have modified tooth profiles each being in the form of a continuous curved surface composed of a concave circular arc having a radius of curvature approximately equal to that of the meshing surface of a sprocket tooth, and a convex circular arc with its center of curvature situated on the dedendum side with respect to the meshing pitch line so that the convex arc slightly interferes with the sprocket tooth. With this tooth profile, it is possible to achieve a significant reduction in the interference between the convex surface of the modified tooth profile and the sprocket tooth at the initial meshing when compared with the interference with occurs with a linear tooth profile. This makes it possible to reduce the interference pressure at the meshing surfaces, and hence to increase the durability of the toothed link plate and the sprocket. Furthermore, in meshing of the concave surface of the link plate with the sprocket tooth, since the profiles of the concave surface of the toothed link plates and the sprocket tooth profiles approximately complement each other, it is possible to increase the contact area of the mutually meshing surfaces and hence to relax the meshing shock significantly. This makes it possible to reduce the average noise level as a whole throughout the range of operating speeds of the chain, from the lowest speeds to the highest. Additionally, by irregular positioning of the toothed link plates having a meshing pitch different from that of the modified link plates, it is possible to disperse the meshing periods, and thereby suppress the generation of noise peaks by balancing individually generated noises against one another. The invention has the highly desirable effect of simultaneously achieving a reduction in the average noise level of the chain and suppression of noise peaks over the speed range of the chain. In addition, in accordance with the second embodiment, in which toothed link plates having the modified tooth profile but a different meshing pitch, are interspersed, at irregular intervals, among other teeth having the modified profile, it is possible to achieve further reductions in the average noise level.

The invention is applicable to power transmissions comprising a chain and two sprockets, and also to power transmissions having more than two sprockets. Various modifications other than those specifically described herein can be made without departing from the scope of the invention as defined in the following claims.

We claim:

1. A silent chain having improved noise reduction comprising multiple link plates interconnected to form a closed loop adapted for connection of two or more sprockets in driving relationship, each link plate having meshing surfaces adapted to engage the teeth of a sprocket at a pitch line, wherein:

the majority of the link plates in said chain are link plates in which the meshing surfaces have a modified tooth profile in the form of a continuous curved surface composed of a concave circular arc having a radius of curvature approximately equal to that at a meshing point of a sprocket tooth, and a convex circular arc having a radius of curvature such that the convex arc is positioned to interfere slightly with the sprocket teeth which it engages, the center of curvature of the convex arc being situated on a dedendum side of the pitch line relative to the chain;

a minority of the link plates in said chain having their meshing surfaces in the form of linear tooth profiles and being disposed irregularly along the length of the chain; and a meshing pitch of each of said linear tooth profile link plates is slightly different from that of the modified tooth profile link plates.

2. A silent chain having improved noise reduction comprising multiple link plates interconnected to form a closed loop adapted for connection of two or more sprockets in driving relationship, each link plate having meshing surfaces adapted to engage the teeth of a sprocket at a pitch line, wherein:

the majority of the link plates in said chain are link plates in which the meshing surfaces have a modified tooth profile in the form of a continuous curved surface composed of a concave circular arc having a radius of curvature approximately equal to that at a meshing point of a sprocket tooth, and a convex circular arc having a radius of curvature such that the convex arc is positioned to interfere slightly with the sprocket teeth which it engages, a center of curvature of the convex arc being situated on a dedendum side of the pitch line relative to the chain; and said majority of the link plates include a set of link plates having a meshing pitch slightly different from a meshing pitch of the remaining link plates of said majority, said link plates having a different meshing pitch being disposed irregularly along the length of the chain.

* * * * *